July 9, 1940.  P. GREIG  2,207,120
CANISTER
Filed June 13, 1938   2 Sheets-Sheet 1

Inventor
Paul Greig
Edward V. Hardway
Attorney

July 9, 1940. P. GREIG 2,207,120
CANISTER
Filed June 13, 1938 2 Sheets-Sheet 2

Inventor
Paul Greig
Edward V. Hardway
Attorney

Patented July 9, 1940

2,207,120

UNITED STATES PATENT OFFICE 2,207,120

CANISTER

Paul Greig, Hempstead, Tex.

Application June 13, 1938, Serial No. 213,313

9 Claims. (Cl. 221—104)

This invention relates to a canister and has particular relation to a dispensing canister specially designed for measuring ground coffee and the like and for discharging measured quantities of the coffee from the canister hopper.

An object of the invention is to provide a dispensing apparatus of the character described wherein a supply of ground coffee or similar material may be kept substantially hermetically sealed with means whereby the contents of the canister may be discharged in fixed quantities as required.

It is a further object of the invention to provide, in a canister of the character described, a hopper having a discharge opening and provided with a movable wall with means for intermittently vibrating said wall to prevent the ground coffee in the hopper from congesting and bridging over the discharge opening to thereby prevent the discharge of the coffee from the hopper.

It is a further feature of the invention to provide a canister of the dispensing type embodying a receiving hopper, a discharge chute and a transfer plunger for transferring given quantities of the material in the hopper from said hopper to said chute to be discharged through the chute by gravity into a suitable receiver for the same.

With the above and other objects in view, the invention has particular relation to certain novel features of construction, operation and arrangement of parts, an example of which is given in this specification and illustrated in the accompanying drawings, wherein.

Referring now more particularly to the drawings wherein like numerals of reference designate the same parts in each of the figures, the numeral 1 designates a container preferably approximately rectangular in horizontal, cross-sectional contour. The upper end of the container may be closed by the removable cap, or cover, 2. The lower end of the container is open and spaced above said open end are the transverse partitions 3, 4. These partitions extend entirely across the container and are spaced apart to provide the outlet opening 5.

Figure 1:
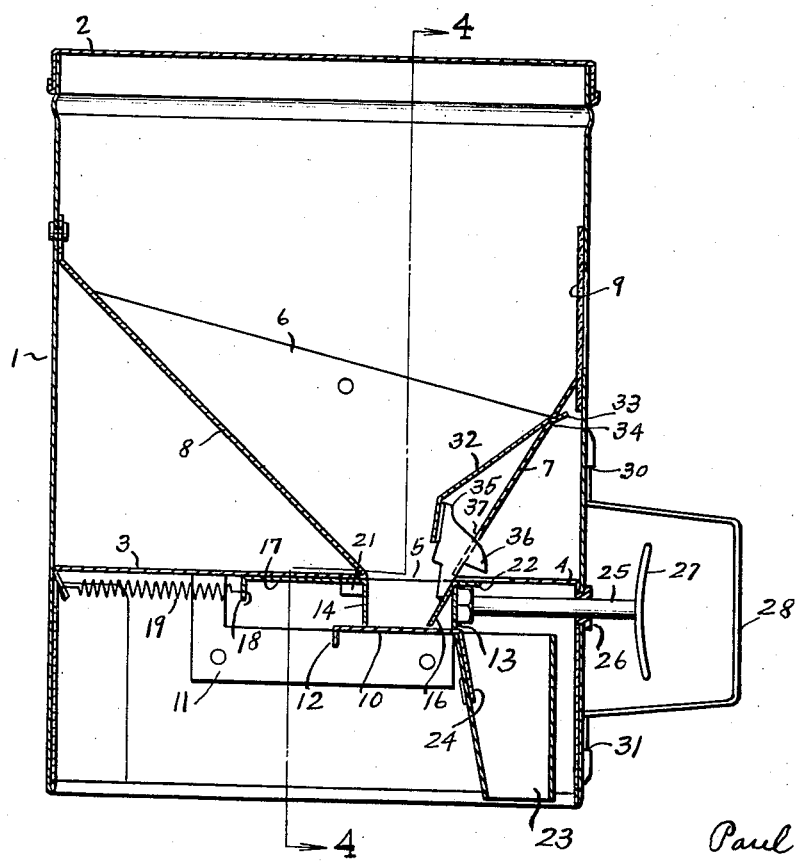
Figure 1 shows a vertical, sectional view of the device showing the transfer plunger in receiving position.
Figure 3:
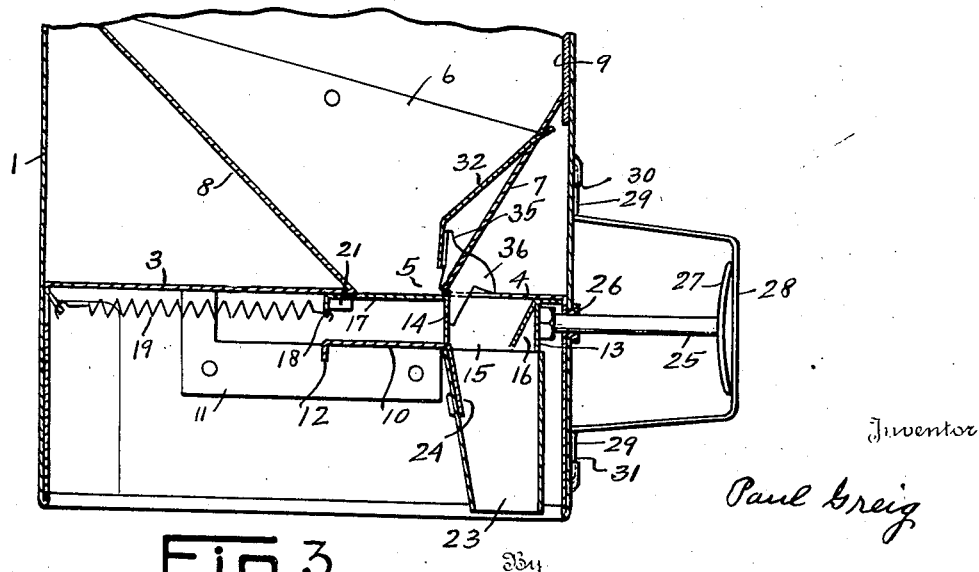
Figure 3 shows a fragmentary sectional view showing transfer plunger in discharging position.

Within the container above the partitions 3, 4 there is a hopper comprising the side walls 6, 6, and the downwardly converging front and rear walls 7, 8. The side walls 6, 6 lie against and are secured to the corresponding side walls of the container 1, as shown more accurately in Figure 4 and the front and rear walls 7, 8 extend entirely across the container and converge downwardly with their lower margins terminating at the front and rear, respectively, of the opening 5 as shown in Figures 1 and 3. The side margins of the walls 7, 8 are suitably fastened to the sides 6, 6 of the hopper and the upper margins of said walls 7, 8 are suitably secured to the front and rear walls of the container 1.

Above the hopper of the container is provided, in its front wall, with the transparent inspection window 9.

Spaced beneath the opening 5 and extending transversely across the container parallel with the partitions 3, 4 there is a supporting platform 10 whose ends may be supported on the inside brackets 11, 11 secured to the side walls of the container. The inner or rear margin 12 of the platform may be downwardly turned between the said brackets 11. On the platform 10 there is a transfer plunger, box-like in form, extending transversely entirely across the container. This plunger is approximately rectangular in horizontal cross-section and has the front and rear walls 13, 14 connected by suitable end walls 15. This transfer plunger is of a length and width substantially the same as that of the discharge opening 5. It has an inside supplemental wall 16 extending from end to end of it and which diverges downwardly from the upper margin of the front wall 13. Extending rearwardly from the upper margin of the rear wall 14 of the transfer plunger there is a guide plate 17 whose rear margin 18 is downwardly turned and a coil spring 19 is attached at one end to said downwardly turned margin 18 and at its other end to the rear wall of the container and normally acts to hold the transfer plunger in receiving position underneath the discharge opening 5 as shown in Figure 1. The guide plate 17 works closely against the underside of the partition 3 and is retained closely against said underside by the guide lugs 21, 21 between which and the partition 3 the side margins of the guide plate 17 move.

The upper margin 22 of the forward wall 13 is forwardly turned and fits closely against the underside of the partition 4.

Figure 4:
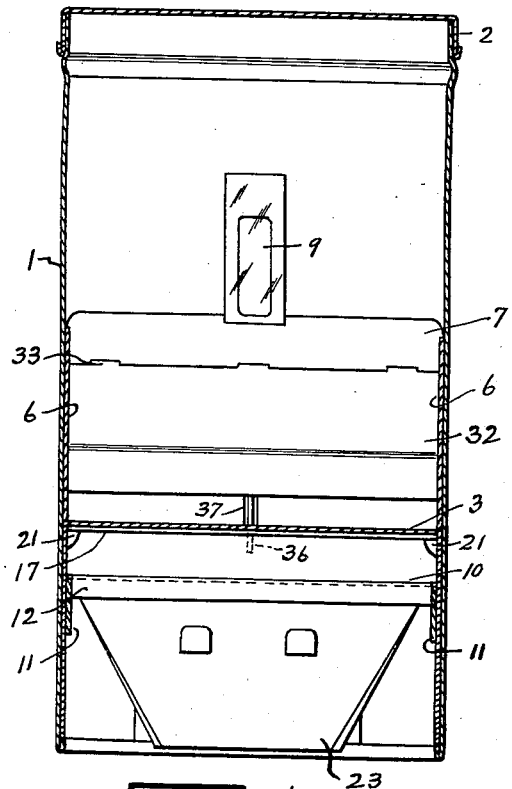
Figure 4 shows a vertical, sectional view taken on the line 4—4 of Figure 1.
Figure 5:
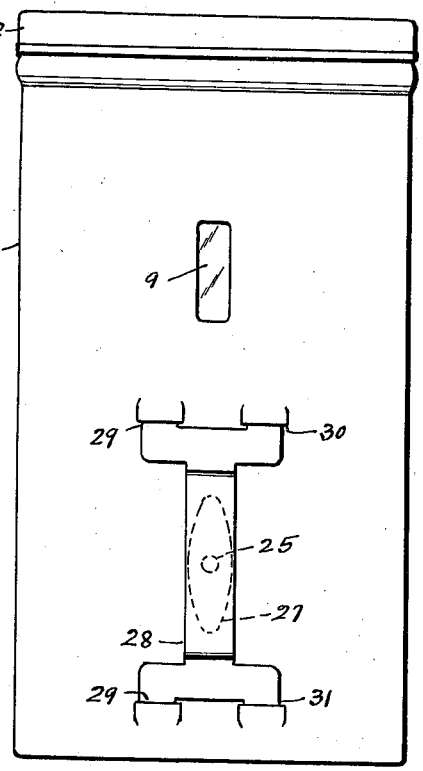
Figure 5 shows a front elevational view of the canister.

Located in front of, and beneath, the discharge opening 5 there is a discharge chute 23 whose walls converge downwardly as shown in Figures 1, 3 and 4. The forward margin 24 of the supporting platform 10 may be turned downwardly into said chute resting against the rear wall thereof and to which the chute may be secured for support.

An operating rod 25 works through a bearing 26 in the front wall of the container and has its inner end secured to the front wall of the transfer plunger. The outer end of the rod 25 has a suitable grip member 27 attached thereto.

A U-shaped guard 28 is provided. The free ends of the side bars of this guard are widened laterally and outwardly turned to fit closely against the front wall of the container and are provided with the flat outwardly extended tongues 29 which may be fitted through the upper and lower slots 30, 31 cut through said front wall. This guard surrounds the projecting outer end of the rod 25 and is spaced from the grip member 27. It may be easily detached by forcing the side bars of the guard inwardly toward each other to retract the tongues 29 from their corresponding slots 30, 31 and may be replaced or reattached to the container in an obvious manner.

Normally the transfer plunger will be aligned underneath the opening 5 with its measuring compartment aligned with said opening. It will normally be held in that position by the spring 19. Material from the hopper will therefore fall down into and fill the measuring compartment of the plunger. When a measure of material is desired the grip 27 may be engaged by the fingers of the manipulator and with the thumb pressing against the guard 28 the rod 25 will be moved outwardly, moving the transfer plunger outwardly with it into the position shown in Figure 3 and the measure of material will thereupon be discharged from the plunger compartment into the delivery chute 23. Upon release of the grip 27 the spring 19 will return the transfer plunger back to receiving position as shown in Figure 1. It is to be noted that as the transfer plunger moves to discharging position as shown in Figure 3 the guide plate 17 will simultaneously move across and close the discharge opening 5 so that there will be no delivery of the material from the hopper while the transfer plunger is in discharging position.

Figure 2:
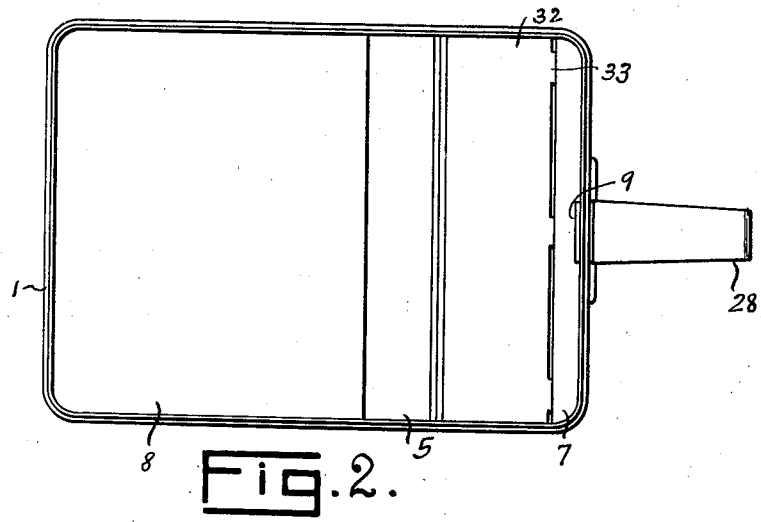
Figure 2 shows a plan view with the cover removed.

In order to prevent the material in the hopper from congesting, and bridging over the discharge opening 5 so as to prevent a free delivery of the material from the hopper the supplemental wall 32 has been provided. It is of sufficient length to extend entirely across the hopper as shown in Figure 2. Its upper margin is pivotally connected to the front wall 7 preferably by means of the tongues 33 which work through slots 34 in said wall 7. The lower margin of the supplemental wall 32 is downwardly turned as shown in Figures 1 and 3. Secured to the outer side of said downwardly turned margin, approximately midway between the ends of the supplemental wall there is an arm 35 having a forwardly extending guide 36 which works through a slot 37 in the lower margin of the wall 7. The lower end of said arm 35 extends down into the measuring compartment of the plunger. Upon forward movement of the plunger into the position shown in Figure 3 the rear wall of the measuring compartment will engage the lower end of the arm 35 and upon movement of the transfer plunger back to receiving position, as shown in Figure 1, the supplemental wall 16 will strike said arm 35 and move the supplemental wall 32 back to its former position so that the supplemental wall 32 will be vibrated thus preventing congestion and clogging of the material contained in the hopper.

Special attention is called to the arrangement and use of the supplemental wall 16. It will be noted from an inspection of the drawings that the lower margin of this wall is spaced a short distance above the upper surface of the supporting platform 10. Upon release of the grip 27 the transfer plunger will move backwardly under the influence of the spring 19 and as soon as the measuring compartment of the plunger begins to register with the opening 5 the material in the hopper above will be fed downwardly and the supplemental wall 16 will engage the material and sweep it backwardly along the platform 10 so that when the lower margin of the wall 13 reaches the horizontal portion of the platform 10 said portion will be clear of the material and said lower margin of said wall 13 will form a close fitting seat with the platform 10 thus preventing particles of the material from being engaged between the wall 13 and the edge of the platform 10 adjacent the chute 23 thus preventing the transfer plunger from returning completely to its position under the opening 5 and allowing the escape and wastage of the material being dispensed.

The drawings and description disclose what is now considered to be a preferred form of the invention by way of illustration only, while the broad principle of the invention will be defined by the appended claims.

What I claim is:

1. A canister for dispensing material comprising a container having a hopper provided with an outlet, a delivery chute, a plunger having a measuring compartment, a guide along which the plunger is movable, means for moving the plunger into one position to cause said compartment to register with the outlet and into another position to cause said compartment to register with the chute and means engaged by the plunger for causing a wall of the hopper to vibrate upon movement of the plunger.

2. A canister for dispensing material comprising a container and having a hopper provided with an outlet one wall of the hopper being movable, a delivery chute, a plunger having a measuring compartment, a guide along which the plunger is movable, means for moving the plunger into one position to cause said compartment to register with the outlet and into another position to cause the compartment to register with the chute and means arranged to be engaged by the plunger effective to impart movement to said movable wall.

3. A canister for dispensing material comprising a container having a hopper provided with an outlet and having a movable wall, a delivery chute, a plunger having a measuring compartment, a guide along which the plunger moves, manually operable means for moving the plunger into position to register the compartment with said chute, means for automatically moving the plunger to another position to cause the compartment to register with said outlet and means for vibrating said movable wall upon movement of the plunger.

4. A canister for dispensing material comprising a container having a hopper provided with an outlet, a delivery chute, a plunger having a measuring compartment, a guide along which the plunger moves, means for moving the plunger into one position to cause said compartment to register with the outlet and means for moving the plunger into another position to cause said compartment to register with the chute, a supplemental wall movably mounted within the hopper and means arranged to be operatively connected with the plunger for agitating the said supplemental wall upon movement of the compartment into registration with the outlet to facilitate the feeding thereof into the plunger compartment.

5. Dispensing apparatus comprising a container provided with an outlet and having a discharge opening, means for moving a measured quantity of the material from said outlet to said opening to permit discharge of the material therethrough and a movable wall within the container for agitating the material to facilitate the feeding thereof through said outlet.

6. Dispensing apparatus comprising a container provided with an outlet and having a discharge opening, means for moving measured quantities of material from the outlet to the opening to permit discharge of the material and a yieldably mounted agitator wall arranged to be vibrated by the moving means to facilitate the feeding of the material through said outlet.

7. Dispensing apparatus comprising a container provided with an outlet and a delivery chute having a discharge opening, a transfer plunger having a measuring compartment, a guide along which said plunger moves, means for moving the plunger into one position to cause said compartment to register with said opening, means for moving the plunger into another position to cause said compartment to register with said outlet, said compartment having a rearwardly declining supplemental wall, supplemental walls inside said container, agitating means within the container, an arm extending through one of said supplemental walls adjacent the opening, said arm being in contact at one end with said agitating means and its other end being adapted to contact the rearwardly declining supplemental wall of said compartment upon rearward movement of said compartment to move said arm upwardly imparting movement to said agitating means.

8. In a dispensing apparatus, a container, a reciprocable plunger mounted adjacent the container, a measuring compartment adapted to be moved into receiving and discharging position by said plunger, agitating means in the container having an extension thereon which projects into said compartment and which is contacted by the end walls of the compartment upon reciprocation of the plunger to vibrate said agitating means.

9. A canister for dispensing material comprising a container and having a hopper provided with an outlet one wall of the hopper being movable, a plunger having a measuring compartment, said measuring compartment having a delivery opening, a guide along which the plunger is movable, means for moving the plunger into one position to cause said compartment to register with the outlet and into another position to cause the compartment to move out of said registration, means for closing said opening when the compartment is in registration with the outlet, and means arranged to be engaged by the plunger effective to impart movement to said movable wall.

PAUL GREIG.